Dec. 13, 1966 D. A. J. MILLAR 3,290,877
TURBINE ENGINE EXHAUST ARRANGEMENT
Filed Dec. 14, 1964 2 Sheets-Sheet 1

INVENTOR
Douglas Arthur John MILLAR

ATTORNEY

Dec. 13, 1966     D. A. J. MILLAR     3,290,877
TURBINE ENGINE EXHAUST ARRANGEMENT
Filed Dec. 14, 1964     2 Sheets-Sheet 2
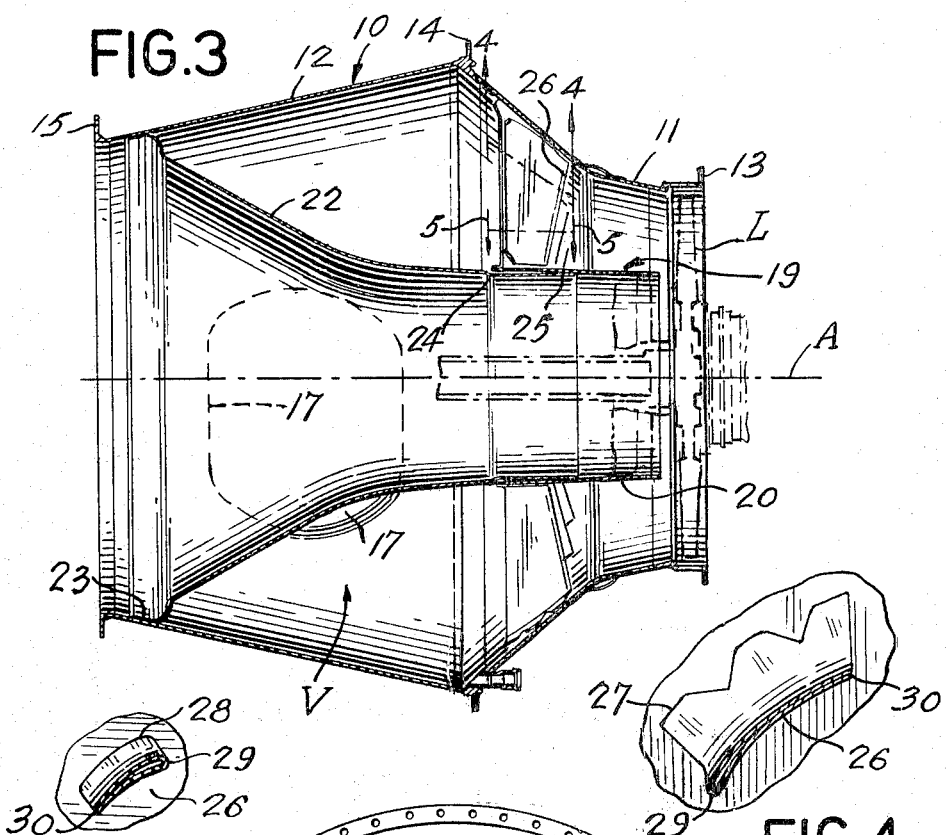
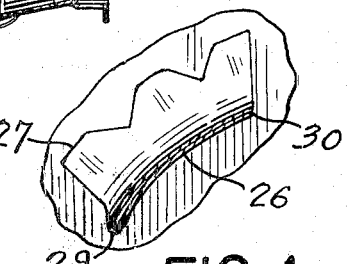
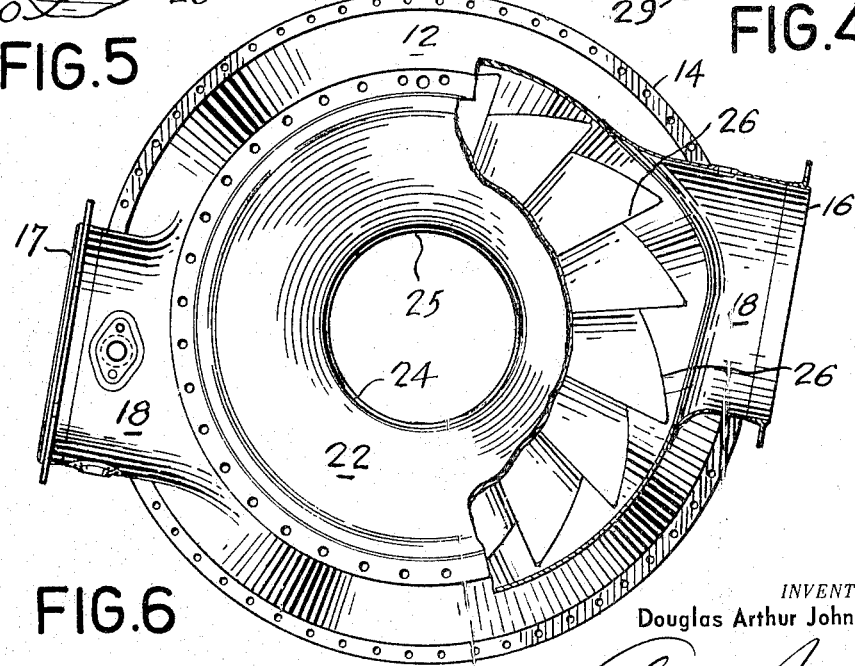
INVENTOR
Douglas Arthur John MILLAR
ATTORNEY

United States Patent Office 3,290,877
Patented Dec. 13, 1966

3,290,877
TURBINE ENGINE EXHAUST ARRANGEMENT
Douglas Arthur John Millar, Ottawa, Ontario, Canada, assignor to United Aircraft of Canada Limited, Longueuil, Quebec, Canada
Filed Dec. 14, 1964, Ser. No. 417,996
10 Claims. (Cl. 60—39.5)

This invention relates to turbine engine exhaust arrangements, and in particular to lateral or sideways exhaust arrangements for turbine engines as distinguished from in-line exhausts.

In turbine engines designed for rotary wing aircraft it is particularly advantageous, and almost essential, to discharge the exhaust gases laterally. This is also advantageous in that it enables the length of the engine to be reduced substantially.

However, problems are encountered in designing lateral exhaust systems which do not arise in straight through exhaust systems. For example, the efficiency of the engine can be excessively impaired unless the engine exhaust system is carefully designed. The main problem is that a back pressure is created at the region where the gases flowing axially out of the engine have to be turned through an angle of, or approaching, 90° and exhausted sideways from the engine. This back pressure, as is well known, has adverse effects on the engine's efficiency and power output.

The main object of the present invention is to provide an engine exhaust system in which the exhaust gases are caused to flow smoothly through one or more lateral exhaust ports without creating a back pressure large enough to affect the last stage of the turbine. To this end, the exhaust system is constructed with vanes past which the gas exhausting from the last stage of the turbine is caused to flow before reaching the exhaust port or ports. The gas, as it flows from the turbine's last stage to the vanes, has a component of velocity in the axial direction and in addition has a substantial tangential velocity, imparted to it by the turbine blades, tending to rotate or swirl the gas about the engine's main axis. The vanes are so arranged that, in passing through the vanes, the gas is guided towards the tangential direction while its axial velocity is diminished. The gas flows through the vanes directly into an exhaust volute or scroll and is permitted to expand into the volute. The outlet port or ports are in the lateral walling of the volute or scroll and arranged so that the gas swirling in the output volute flows tangentially with respect to the engine's axis through the exhaust port or ports. Consequently, the flow path of the exhaust gas is not turned through any sharp angles and it is a tangential velocity imparted to the gas which causes the gas to exhaust smoothly without a further change in direction.

Having generally described the invention the same will now be described in greater detail with reference to the drawings, in which.

Figure 1:
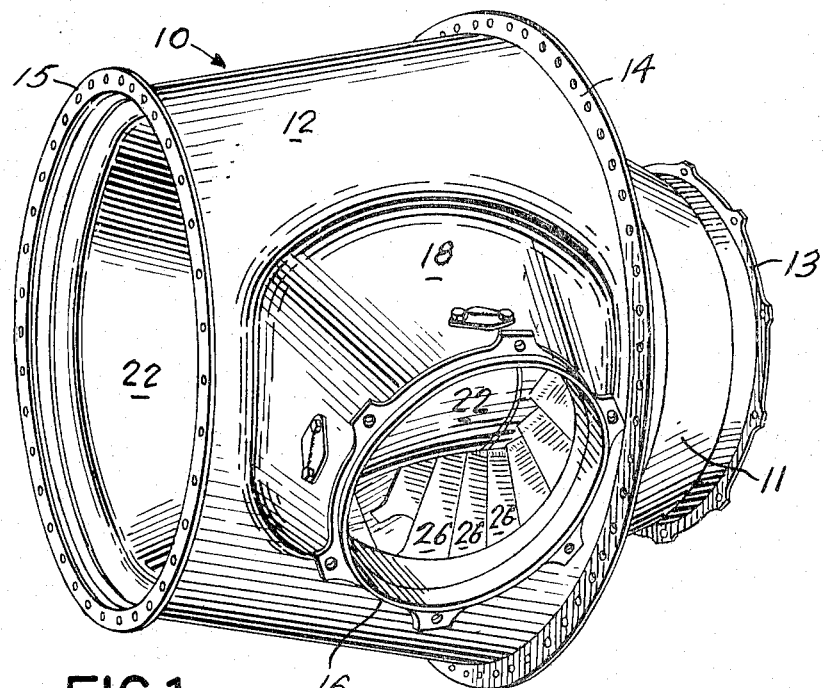
FIGURE 1 is a perspective view of the exhaust casing of a turbine engine.
Figure 2:
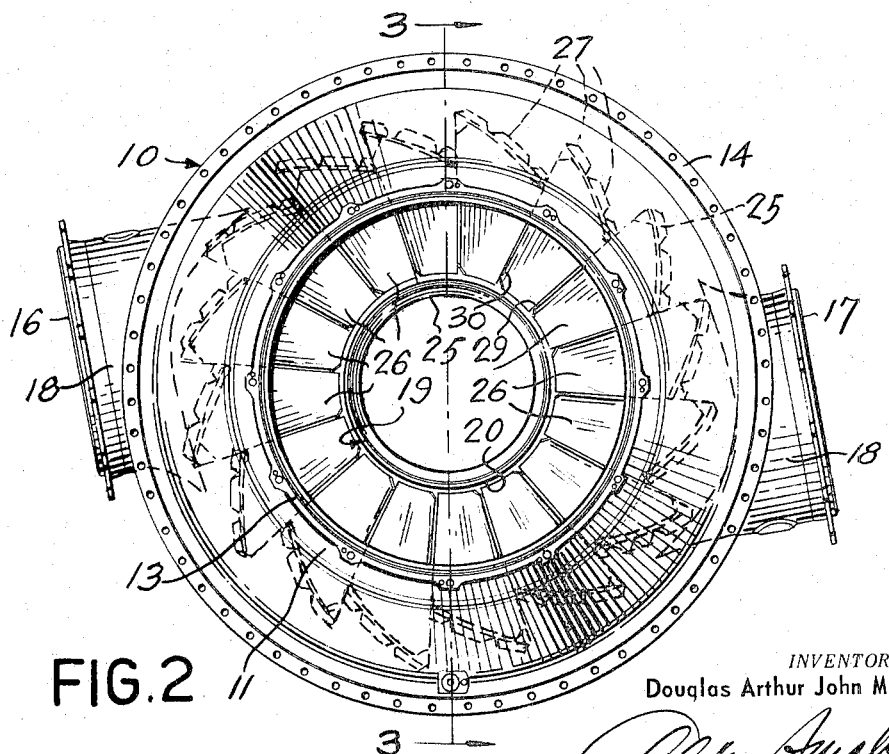
FIGURE 2 is a front view of the casing of FIGURE 1.

FIGURE 3 is a vertical, axial cross-section of the casing of FIGURE 1 taken on the line 3—3 of FIGURE 2 and also shows the last turbine stage, FIGURE 4 is a section on the line 4—4 of FIGURE 3, FIGURE 5 is a section on the line 5—5 of FIGURE 3, and FIGURE 6 is a rear view, partly broken away, of the casing of FIGURE 1.

The exhaust casing illustrated includes an outer duct 10 of heat resistant steel having a divergent forward section 11 and a convergent rearward section 12. The forward section is bounded by two annular flanges 13 and 14, the flanges 13 and 14 being adapted to be bolted to corresponding flanges of the combustion and turbine stages of the engine. The rearward section 11 is bounded by the flange 14 and by a further flange 15 adapted to be bolted to a corresponding flange of the reduction gear box (not shown).

The section 12 has two outlet ports 16 and 17 each defined by a short cylindrical duct 18 projecting from the walling of the duct 10.

The exhaust casing also includes an inner hollow duct 19 having a slightly conical tubular front section 20 and a flared, bell-shaped rear section 22. The section 22 is entered in the larger, open, rear end of the section 20 and has its own larger end formed into a continuous rim 23 which is welded to the inside of the section 12 adjacent the flange 15. The reduction gear box (if one is required) is mounted partly within the section 22. The section 22 is stepped at 24 where it emerges from the section 20, and engages the inside of the section 20 along a circular zone 25. The step 24 is at approximately the same zone as the flange 14 so that the section 20 is radially within the section 11, and section 22 is radially within the section 12. There is thus defined a ring-like passage which increases in cross-sectional area with increasing distance from the last turbine stage (reference L in FIGURE 3 and which rotates about the main axis A of the engine) as the sections 20 and 11 diverge and then decreases to zero as the sections 22 and 12 converge. The junction between the sections 12 and 22 closes the rear end of the casing. The ring-like passage connects the last stage L to the volute generally indicated at V.

The rear end of the section 20 is surrounded by an annular array of curved, sheet metal vanes 26 which extend outwardly from section 20 towards the section 11. Each vane 26 has an aerofoil shape, as illustrated by FIGURES 4 and 5, and the ends of the vanes 26 are turned over, as at 27 and 28, and spot welded to the sections 11 and 20 respectively. The leading edge of each vane is referenced 29 and the trailing edge 30. The chordal length of each vane increases with increasing distance from the section 20. The vanes 26 are designed for a last turbine stage L which has a clockwise drive direction of rotation (as viewed in FIGURE 2). The trailing edge 30 of each vane is displaced in the direction opposite said drive direction about the axis A with respect to the leading edge thereof. Furthermore, each vane has an aerofoil cross-section with its concave surface facing in said opposite direction.

The action of the illustrated exhaust casing is as follows.

The exhaust gas leaving the turbine stage not only has a velocity axially with respect to the engine centerline, but also has a pronounced tendency to swirl tangentially. It will be understood that the flowing gas impinges on the vanes 26 and in passing between the vanes the tangential velocity of the gas may be increased. The axial component of the gas velocity is reduced at the same time. Beyond the vanes 26, the gas expands into the exhaust volute V defined between the inner and outer sections 12 and 22. There is consequently a reduction in the dynamic pressure of the exhaust gas which is now swirling in such a manner that it flows smoothly into the ducts 18 and through the ports 16 and 17. The ports 16 and 17 have their longitudinal axis parallel and substantially tangential to the inner section 22.

It is possible, in installations where space factors or the surrounding components require it, to have a single lateral exhaust duct 18 for directing the exhaust gases to the exterior of the engine.

I claim:

1. In an axial flow gas turbine engine having a last turbine stage from which gas exhausts with both axial and tangential velocities imparted thereto by said last turbine stage, an exhaust structure comprising interior ducting extending axially of the engine, exterior ducting extending axially of the engine, the interior and exterior ducting being relatively immovable with respect to one another and cooperating to define an exhaust volute and a ring-like passage of progressively increasing cross-sectional area forming an exhaust gas flow path from said last stage to said volute, parts of said exterior ducting defining an exhaust port extending laterally through said exterior ducting and placing said exhaust volute in communication with atmosphere, said exhaust port having its main axis tangentially arranged with respect to said interior ducting and vanes in said ring-like passage past which said gas flows while exhausting from said last stage to said volute, said vanes being adapted to guide said gas towards the tangential direction, while diminishing the axial velocity thereof, whereby the flow path of said gas in said volute is substantially around the axis of the engine and the gas exhausts smoothly through said port.

2. In an axial flow gas turbine engine having a last turbine stage from which gas exhausts with both axial and tangential velocities imparted thereto by the last turbine stage, an exhaust structure including exterior ducting and interior ducting extending axially of the engine and cooperating to define an exhaust volute and a ring-like passage of progressively increasing cross-sectional area, the passage forming an exhaust gas flow path from said last stage to said volute, parts of said exterior ducting defining an exhaust port extending laterally through said exterior ducting and placing said volute in communication with atmosphere, said exhaust port having its longitudinal axis substantially tangential to said inner ducting, and vanes in said ring-like passage past which said gas flows while exhausting from said last stage to said volute, said vanes being adapted to guide said gas towards the tangential direction while diminishing the axial velocity thereof whereby the flow path of said gas in said volute is substantially around the axis of the engine and the gas exhausts smoothly through said port.

3. The structure claimed in claim 2, in which further parts of said exterior ducting define a further exhaust port diametrically opposed to the first mentioned port and having a longitudinal axis parallel to said longitudinal axis of the first mentioned port.

4. The structure claimed in claim 8 in which each of said curved sections is of aerofoil configuration with its concave surface facing in said drive direction.

5. The structure claimed in claim 8 and having two outlet ports extending laterally of the engine through said second parts of said ducting.

6. An axial flow gas turbine engine comprising a last turbine stage rotatable in a drive direction about a main longitudinal axis of the engine, interior ducting including a first substantially cylindrical portion adjacent said last stage and a second, conically flared portion merging at its small diameter end with said first portion on the side of the first portion remote from said last stage, exterior ducting surrounding said interior ducting and including first and second hollow substantially frusto-conical portions abutting at their large diameter ends, said first portions defining a ring-like passage increasing in cross-sectional area with increasing distance from said last stage, and the second portions defining an expansion volute, parts of said second frusto-conical portion defining an outlet port connecting said volute with atmosphere, the outlet port having a longitudinal axis substantially tangential to said second, conically flared portion, and vanes in said ring-like passage, each vane having a leading edge and a trailing edge and a curved section joining the leading and trailing edges with the trailing edge displaced around said axis opposite said drive direction with respect to said leading edge, said vanes being adapted to guide said gas towards the tangential direction, while diminishing the axial velocity thereof, whereby the flow path of said gas in said volute is substantially around the axis of the engine and gas exhausts smoothly through said port.

7. In combination, an axial flow gas turbine engine having a last stage from which gas exhausts with both axial and tangential velocities imparted thereto by said last turbine stage, and an exhaust structure including a first ducting part extending axially of the engine for conveying exhaust gas axially away from the last turbine stage without any change in the direction of gas flow, a second ducting part forming an axially aligned extension of the first ducting part and constituting an expansion volute, portions of said second ducting part defining an exhaust port extending laterally of the longitudinal axis of the combination and placing said volute in communication with atmosphere, a third ducting part axially aligned with and intermediate the first and second ducting parts, and vanes in said third ducting part past which said gas flows during its passage from said last stage to said exhaust port, said vanes being adapted to guide said gas towards the tangential direction, while diminishing the axial velocity thereof, whereby the flow path of said gas in said volute is substantially around the axis of the engine and the gas exhausts smoothly through said port.

8. An axial flow gas turbine engine comprising a last turbine stage rotatable in a drive direction about a main longitudinal axis of the engine, ducting including interior and exterior sections extending axially away from the engine for conveying exhaust gas from said last turbine stage, a first part of each of said sections co-operating to define a ring-like passage increasing in cross-sectional area with increasing distance from said last stage, a second part of each of said sections co-operating to define an expansion volute connected to said last stage by said ring-like passage, said first and second parts being co-axial with said main longitudinal axis and forming axial extensions of said engine, and third parts of said ducting defining an exhaust gas outlet port extending laterally of the engine and placing said volute in communication with atmosphere, said port having its axis tangential to said second part of said interior section, and vanes in said ring-like passage, each vane having a leading edge and a trailing edge and a curved section joining the leading and trailing edges with the trailing edge displaced around said axis opposite said drive direction with respect to said leading edge, said vanes being adapted to guide said gas towards the tangential direction, while diminishing the axial velocity thereof whereby the flow path of said gas in said volute is substantially around the axis of the engine and the gas exhausts smoothly through said port.

9. The structure of claim 1, wherein each of said vanes is fixedly secured to both the interior and exterior ducting.

10. The combination according to claim 7, wherein said exhaust structure includes interior and exterior ducting sections, and wherein said vanes are each secured to both said sections.

References Cited by the Examiner

UNITED STATES PATENTS

| | | | |
|---|---|---|---|
| 803,759 | 11/1905 | Herles | 253—77 |
| 1,888,452 | 11/1932 | Clark | 230—47 |
| 2,288,734 | 7/1942 | Noack | 60—67 X |
| 2,923,462 | 2/1960 | Stalker | 253—39 |

FOREIGN PATENTS

| | | |
|---|---|---|
| 898,525 | 6/1962 | Great Britain. |

MARK NEWMAN, *Primary Examiner.*

RALPH D. BLAKESLEE, *Examiner.*